United States Patent [19]
Gallinato-Contino

[11] 3,985,403
[45] Oct. 12, 1976

[54] GUIDE DEVICES
[75] Inventor: Roland Gallinato-Contino, Nanterre, France
[73] Assignees: Regie Nationale des Usines Renault; Automobiles Peugeot, both of France
[22] Filed: Mar. 4, 1975
[21] Appl. No.: 555,116

[30] Foreign Application Priority Data
Mar. 27, 1974 France............................ 74.10579

[52] U.S. Cl. ............................................. 308/3.6
[51] Int. Cl.² ........................................ F16C 29/00
[58] Field of Search .................................. 308/3.6

[56] References Cited
UNITED STATES PATENTS
2,149,186  2/1939  Schlemmer........................ 308/3.6

Primary Examiner—M. H. Wood, Jr.
Assistant Examiner—Gene A. Church
Attorney, Agent, or Firm—Bucknam and Archer

[57] ABSTRACT

A guide device for receiving a slideable element, the device comprising laterally spaced series of studs with each stud of each series arranged opposite a space between two adjacent studs of the other series. Studs of each series are spaced apart a distance at least equal to the width of one stud of the opposing series. This guide device is produced by a moulding process especially an injection-moulded process and due to the disposition and arrangement of the studs the moulding process and equipment is simplified.

4 Claims, 10 Drawing Figures

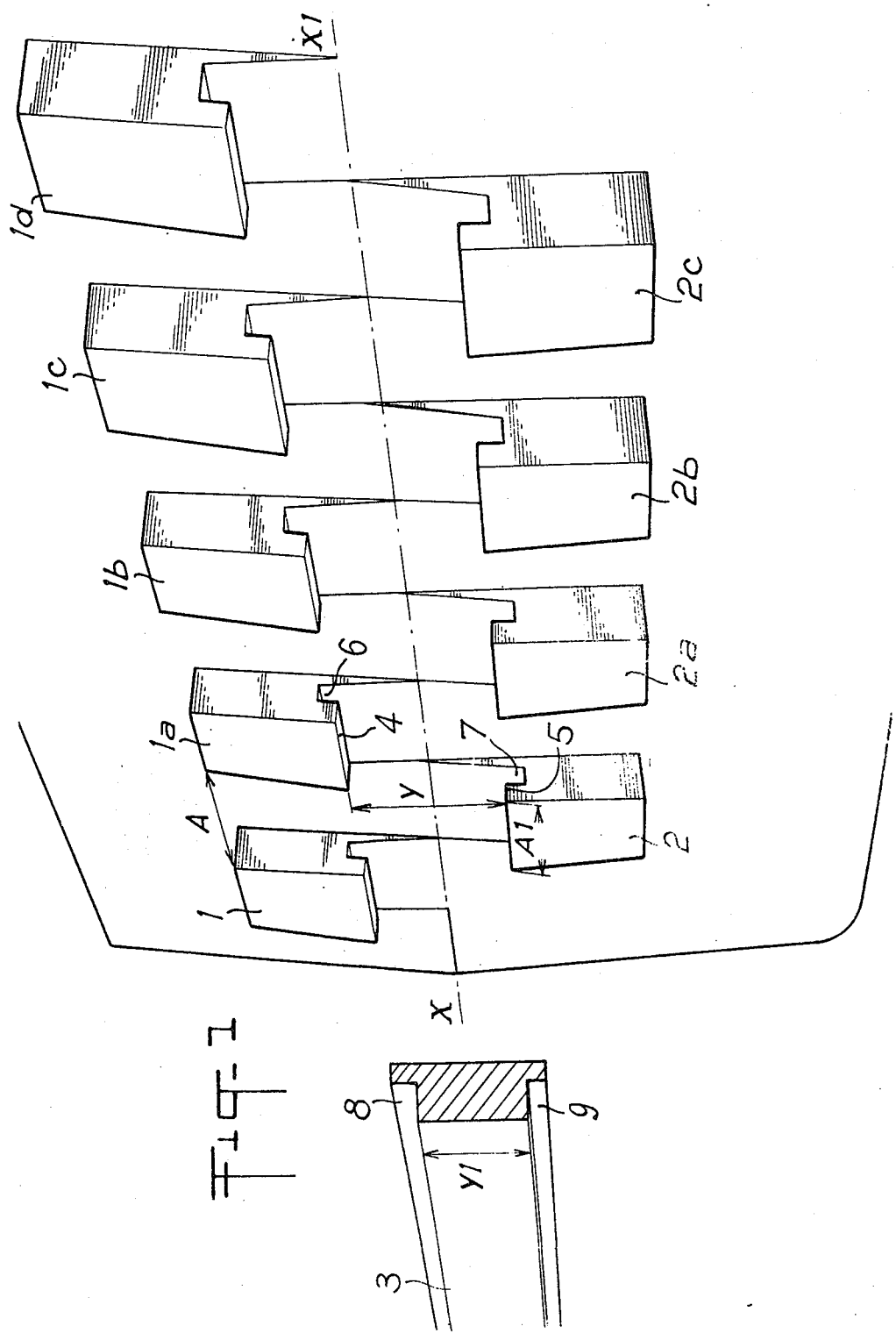

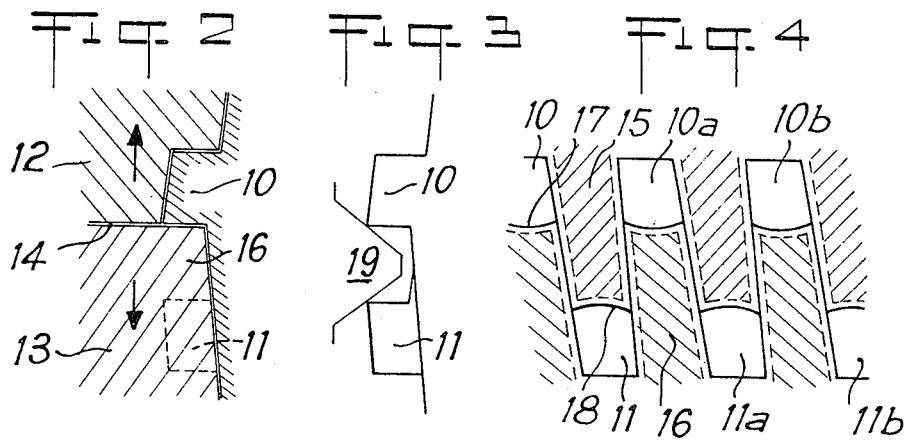
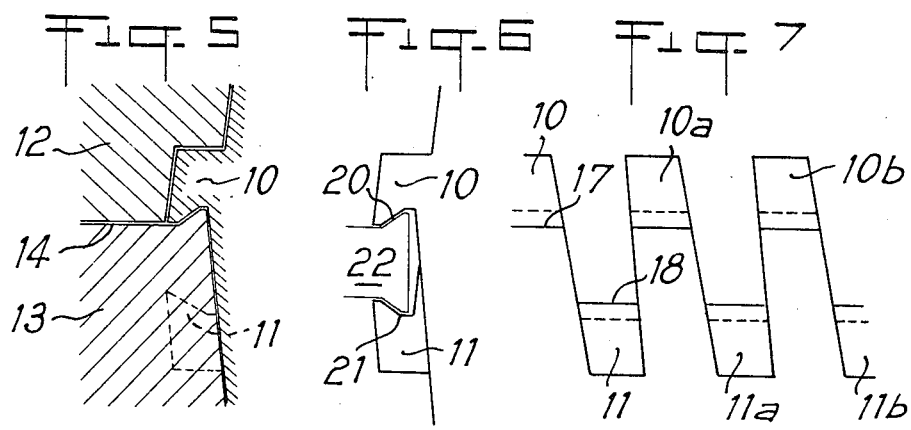
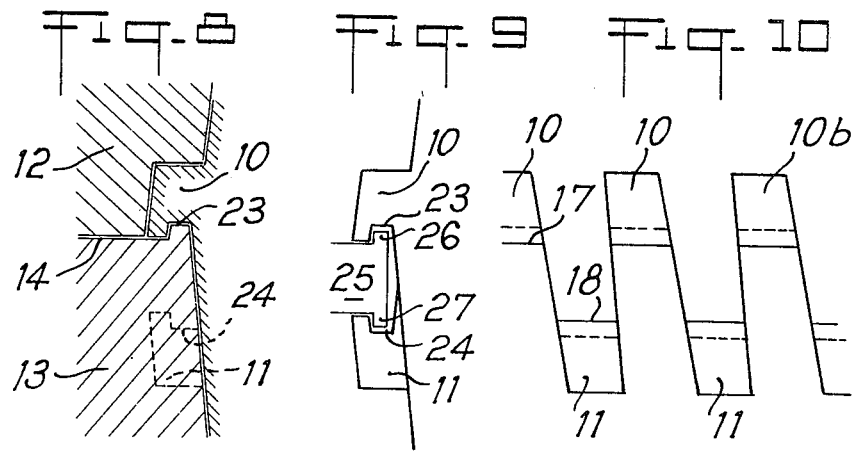

GUIDE DEVICES

The present invention relates to a guide device and its method of production by moulding.

The invention relates to the production of components from injection-moulded plastics material or any component produced from a material and with a technique similar to injection, such, for example as casting under pressure.

The invention is particularly concerned with guide devices intended to ensure the guidance of a male member and arranged on a plane or cylindrical surface, passing through the stripping plane.

These guide devices are intended especially but not exclusively for use in ash-tray drawers or trays.

In known methods for the production of such guide devices slides or movable members are used, which are mounted on the mould to produce the openings corresponding to the guides.

These known methods have drawbacks owing to the fact that the mould to be produced is more complicated and consequently its cost price is high. Furthermore, the manufacture of components requires a longer time, owing to the time required for operating the slides or moving members and this results in a higher cost price for the parts. Furthermore, these methods do not make it possible to produce certain profiles of guides.

The present invention provides a particular guide device which may be easily obtained by moulding.

According to the present invention, there is provided a guide device comprising two series of studs arranged on either side of a longitudinal axis of the guide and spaced apart by a distance corresponding to the width of the guide, each series comprising studs spaced apart by a distance at least equal to the width of one stud of the series located on the other side of the axis of the guide, such that corresponding to each stud of one series is a free space between two consecutive studs of the other series.

The guide device according to the invention may be obtained by means of moulds specially comprising only two main parts with the exclusion of lateral slides for stripping the guides.

The guides obtained according to the invention may have an industrial application for any drawer, ash-tray or box, operating by sliding.

The guide device according to the invention has several advantages as regards the use of a mould of simpler design and lower cost, the possibility of reducing manufacturing time of the components and obtaining a lower cost price, the possibility of producing certain shapes of profile which it was impossible to produce by means of lateral slides in the mould, since these shapes have undercut parts which cannot be stripped by known methods.

Embodiments of the present invention will now be described by way of example, with reference to the accompanying drawings, in which:

FIG. 1 is a perspective view of one embodiment of a guide device according to the invention;

FIG. 2 is a sectional view of a mould for producing one profile of guide;

FIG. 3 is an outline view of one embodiment of the guide corresponding to the profile of fig. 2;

FIG. 4 is a plan view of the guide illustrated in Fig. 3;

FIG. 5 is a sectional view of a mould for producing another profile of guide;

FIG. 6 is an outline view of one embodiment of the guide corresponding to the profile of Fig. 5;

FIG. 7 is a plan view of the guide illustrated in Fig. 6;

FIG. 8 is a sectional view of the mould for producing another profile of guide;

FIG. 9 is an outline view of one embodiment of the guide corresponding to the profile of Fig. 8;

FIG. 10 is a plan view of the guide illustrated in FIG. 9.

FIG. 1 shows one embodiment of a guide device according to the invention, which comprises two series of studs 1, 1a, 1b, 1c, 1d and 2, 2a, 2b, 2c located on either side of the axis X X$_1$ of the guide and seperated by a distance Y corresponding to the width Y$_1$ of the male part or slide 3 sliding in the guide.

The studs of each series are spaced apart, for example between 1 and 1a, by a distance A which is at least equal to the width A$_1$ of the stud 2 of the series located on the other side of the axis X X$_1$ of the guide, such that corresponding to each stud 2, 2a, 2b, 2c of one series is a free space A between two consecutive studs of the other series 1, 1a, 1b, 1c, 1d.

To ensure correct stripping, the distance A between two consecutive studs 1, 1a must be equal to or greater than the width of the stud 2 located on the other side of the axis X X$_1$ increased by an adequate clearance on both sides of the studs 1, 1a.

In the embodiment illustrated in FIG. 1, the parallel faces 4 and 5 of studs separated by the distance Y comprise a groove 6, 7 in order to constitute a guide groove having interruptions, for each series of studs 1 or 2.

Engaged in these grooves 6 and 7 are corresponding ribs 8 and 9 of a male member or slide 3 which slides in the guide For producing the guide device according to the invention (FIG. 2), a mould is used constituted by two half-shells 12, 13, whereof the parting plane 14 passes through the axis X X$_1$ of the guide.

Each half-shell 12, 13 comprises bosses 15, 16 (FIGS. 2 and 4) forming the free spaces between the studs 10, 10a and 11, 11a, said bosses 15 of one half-shell 12 forming with the bosses 16 of the other half-shell 13, cavities in which the studs 10, 10a or 11, 11a are formed.

In FIGS. 3 and 4, the studs 10 and 11 have two opposite sides 17, 18 which are curvilinear and between which is engaged a male member 19 of trapezoidal section, which is in contact with two edges defining said faces.

In FIGS. 5, 6 and 7, another profile of the studs 10, 10a, 10b and 11, 11a, 11b of a guide according to the invention is shown, said studs comprising on their opposite sides 17, 18, grooves 20, 21 which are substantially triangular, in which is engaged a male member or slide 22 of a shape corresponding to the grooves 20, 21.

FIGS. 8, 9 and 10 illustrate another profile of the studs 10, 10a, 10b and 11, 11a, 11b of a guide according to the invention and the shape of the half-shells 12, 13 which make it possible to produce the moulding.

As in the preceding embodiment, grooves 23, 24 are provided during moulding in the opposite sides 17, 18 of the studs 10 and 11. The profile used is substantially identical to that of FIG. 1 and the male member or slide 25 comprises two ribs 26, 27 which are engaged in the grooves 23, 24 of the studs of the guide.

What is claimed is:

1. The combination of a slidable element and a guide device comprising a slidable element and a guide device therefor, said guide device comprising a pair of parallel elongated members in face to face relationship, located around a central axis, each member having a plurality of studs, the distance between two studs being at least equal to the width of each of the studs on the other member, the studs being staggered and being so located that corresponding to each stud on one member is a free space between two studs in the other member, the parallel faces of the studs which are closest to each other and the slidable element having means for interengagement when the slidable element is inserted between said two members, the width of the slidable element corresponding to the distance between said elongated members.

2. The combination according to claim 1 wherein the slidable element has a trapezoidal section and the faces of the studs are curvilinear and the means for interengagement are said trapezoidal section which engages with said curvilinear faces.

3. The combination according to claim 1 wherein the slidable element has a rib on each of the upper and lower edge and the parallel faces of the studs which are closest to each other have a groove and when the slidable element is inserted between the two members, the ribs engage with the grooves.

4. The method of manufacturing the combination of a slidable element and a guide device therefor, said guide device comprising a pair of parallel elongated members in face to face relationship, located around a central axis, each member having a plurality of studs, the distance between two studs being at least equal to the width of each of the studs on the other member, the studs being staggered and being so located that corresponding to each stud on one member is a free space between two studs in the other member, the parallel faces of the studs which are closest to each other and the slidable element having means for interengagement when the slidable element is inserted between said two members, the width of the slidable element corresponding to the distance between said elongated members, which comprises molding the slidable element, molding the guide device by means of two half-shells, the parting plane of the two half-shells passing through said central axis, each half-shell comprising bosses forming free spaces between two studs and said bosses of one half-shell forming cavities with the bosses of the other half-shell in which cavities the studs are formed.

* * * * *